2,847,458
Patented Aug. 12, 1958

2,847,458

PREPARATION OF ARYLPHOSPHONIC ACIDS

Tsai H. Chao, Somerville, Hans Z. Lecher, Plainfield, and Ruth A. Greenwood, Somerville, N. J., assignors to American Cyanamid Company, New York, N. Y., a corporation of Maine No Drawing. Application March 25, 1955
Serial No. 496,934

15 Claims. (Cl. 260—500)

This invention relates to a new process of preparing arylphosphonic acids. It also relates to arylthionophosphine sulfides which are new compounds and are intermediates in said process.

A number of arylphosphonic acids having the formula $ArPO(OH)_2$ in which Ar is an aryl radical have been known but until recently they have been laboratory curiosities because the only way of preparing them was by round-about and expensive processes which precluded their practical utilization.

The first process which permitted production of arylphosphonic acids with sufficient efficiency to make them practical on a commercial scale is described and claimed in Patent No. 2,717,906, issued September 13, 1955, on the copending application of Lecher, Chao, and Whitehouse, Serial No. 345,264, filed March 27, 1953, which is a continuation-in-part of an earlier application, Serial No. 286,614, filed May 7, 1952, and now abandoned. According to this process carbocyclic aromatic compounds —free from polar groups capable of reacting with phosphoric anhydride—were phosphonated with hexagonal phosphoric anhydride within a temperature range of from 250–325° C. Reaction products were obtained which on hydrolysis with water yielded arylphosphonic acids. The reaction products were also convertible into arylphosphonic dichlorides by reaction with phosphorus pentachloride as described and claimed in the copending application of Greenwood, Scalera and Lecher, Serial No. 357,368, filed May 25, 1953, now U. S. Patent No. 2,814,645, dated November 26, 1957.

While this new process gave satisfactory yields of arylphosphonic acids based on the real usage of the aromatic compounds (an excess of the aromatic compound was used but could be recovered and re-used), the process still possessed certain drawbacks from the cost standpoint. The most serious factor is that only one or two at most of the phosphorus atoms of the phosphoric anhydride $P_4O_{10}$ reacted with the aromatic compound. The remaining phosphorus was either lost as phosphoric acid in the case of water hydrolysis or had to be removed as phosphorus oxychloride in the case of production of phosphonic dichlorides. In both cases this represented a waste of raw materials and added to the cost of the final arylphosphonic acids.

Another drawback was that with certain aromatic compounds such as naphthalene or alkyl derivatives of benzene the phosphoric anhydride catalyzed condensation reactions forming by-products which complicated the isolation of the phosphonic acids and, of course, lowered the yields.

The present invention avoids the disadvantages of the prior process by using phosphorus pentasulfide or its chemical equivalents instead of the hexagonal phosphoric anhydride. Reactions of phosphorus pentasulfide with hydrocarbons, including aromatic hydrocarbons, are not new in the art. However, the resulting products have been mixtures containing not only thionophosphine sulfides but also lower sulfides of phosphorus and other by-products of the reaction. Thus it is not surprising that either no structures or incorrect structures have been assigned to them. Generally these reaction products of the prior art have been reacted with other materials such as organic and inorganic bases, metal sulfides, alcohols, phenols, thiols, aluminum chloride and other hydrocarbons in order to produce products which were to be used as additives to mineral oils to prevent corrosion or to impart extreme pressure lubricating or detergent properties to the oils. Some of these products have also been proposed as flotation agents.

The prior art reaction products of aromatic hydrocarbons with phosphorus pentasulfide have never been completely hydrolyzed to form phosphonic acids. Some such crude reaction products have been blown with steam or nitrogen to remove malodorous thiocompounds which are formed as by-products. However, the prior art emphasized that after this treatment the products still contained substantial amounts of sulfur, that is to say they were not completely hydrolyzed.

According to the present invention, phosphorus pentasulfide is heated with an aromatic compound at temperatures of 140–250° C., the aromatic compound being free from polar substituents capable of reacting with phosphorus sulfides. Hydrogen sulfide is evolved and an arylthionophosphine sulfide is formed. The latter is then completely hydrolyzed by heating with water to produce good yields of the corresponding arylphosphonic acid without a substantial loss of phosphorus in the form of phosphoric acid or phosphorus oxychloride.

A second advantage of the present invention is that the phosphorus sulfides do not catalyze the condensation of aromatic compounds such as naphthalenes, alkylbenzenes and the like, and therefore this drawback of the earlier process is likewise substantially eliminated by the present invention.

The process is applicable in general to aromatic compounds that are free from polar groups capable of reacting with phosphorus sulfides such as hydrocarbons, e. g. benzene and its homologues, naphthalene and its homologues, anthracene, phenanthrene; phenol ethers, e. g. anisole, phenetole. The ethers of monocyclic monohydric phenols react with especial ease and give very high yields of the thionophosphine sulfides and the phosphonic acids.

The reaction temperature will vary with the compounds; thus for example, some of the phenol ethers such as anisole react very smoothly and quantitatively at about the boiling point. Naphthalene gives best results at about 160–180° C. but on the other hand benzene and some of its homologues such as o-xylene require temperatures of about 225° C. for best results. In general with each compound it is desirable to operate at as low a temperature as possible in the range of optimum temperatures, that is to say as low temperatures as produce reasonably fast evolution of hydrogen sulfide. Higher temperatures in the case of each compound while still giving good yields are less desirable as there is some effect on the yield and purity of the products obtained.

A very important, one might say very critical, requirement is that there be a large excess of aromatic compound. In general the excess should be at least five moles of aromatic compound per mole of $P_4S_{10}$. Larger ratios such as 10 or even 20 to 1 are preferable but, of course, after the optimum results are obtained, further excess of aromatic compound, while it does not adversely affect the reaction, does reduce the output of the equipment, and therefore very large excesses over that required for optimum results are not economically attractive.

The main reaction proceeds according to the equation

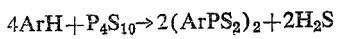

where Ar stands for aryl. However, side reactions take place in varying degrees with some aromatic compounds resulting in the production of lower sulfides of phosphorus which are not reactive. In the case of ethers of monocyclic, monohydric phenols this side reaction is insignificant, but with benzene and naphthalene it takes place to a considerable extent. When a sparingly soluble lower sulfide of phosphorus is formed it crystallizes together with the arylthionophosphine sulfide contaminating the latter. This is of little consequence if it is to be used only as intermediate in further reactions, e. g. in the hydrolysis to give the phosphonic acid or in the chlorination to give an aryltetrachlorophosphorane or arylphosphonothioic dichloride. However, it renders the preparation of pure arylthionophosphine sulfides more difficult.

The prior art has described the reaction product of naphthalene with $P_4S_{10}$ as a compound having the formula

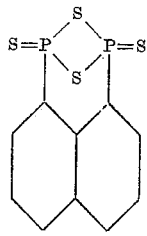

Actually it is a mixture of 2- (not 1-) naphthylthionophosphine sulfide with a lower sulfide of phosphorus. This reference was badly misleading since a compound having the above formula would give on hydrolysis not a mono- but a di-phosphonic acid with the phosphorus group not in 2 but in 1 position.

In the phosphonation of naphthalene the side reaction can be suppressed to a large degree by using a very great excess of naphthalene (50 mol for 1 mol $P_4S_{10}$): then the pure 2-naphthylthionophosphine sulfide $$(C_{10}H_7PS_2)_2$$

can be isolated. Carrying out the reaction in a ratio of $10C_{10}H_8 : 1P_4S_{10}$ and adding $40C_{10}H_8$ afterwards has not the same effect: the thionophosphine sulfide is contaminated with a lower sulfide of phosphorus and does not crystallize in pure form. The large excess of naphthalene which is necessary to obtain the pure product has therefore not the function of a solvent for the contaminant but is beneficial by its mass action.

However, the use of such a large excess of naphthalene is usually not necessary for practical purposes where the contaminating lower sulfides of phosphorus are either hydrolyzed or chlorinated to easily removable compounds in subsequent reactions.

It is also possible to avoid the formation of lower sulfides of phosphorus to a large extent by carrying out the phosphonation in presence of some free sulfur which converts them to $P_4S_{10}$.

Some of the arylthionophosphine sulfides, in particular p-anisylthionophosphine sulfide, tenaciously retain the solvent from which they have been crystallized. It can be removed only by drying under reduced pressure at elevated temperatures. We are apparently dealing with rather stable clathrate compounds. Thus p-anisylthionophosphine sulfide crystallized from anisole and dried in a vacuum desiccator at ordinary temperature still contained about 12% of anisole; after re-crystallization from o-dichlorobenzene and washing with benzene it contained about 7% benzene which was even more tenaciously held than the anisole. While this phenomenon is of no consequence in the further use of these products, it is of importance for determining their real yield, and for molecular weight determinations.

The molecular weight of p-anisylthionophosphine sulfide, determined on a sample entirely freed from solvent, is that of the dimeric compound. Likewise the molecular weight determination of phenylthionophosphine sulfide corresponding to the dimer when the occluded solvent was taken into account.

While these dimers are stable at ambient temperature, they undergo further gradual polymerization on heating, forming brittle, transparent resins having probably the structure

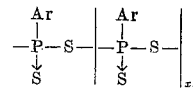

where "$x$" stands for an indefinite whole number. In the case of p-anisylthionophosphine sulfide polymers of the formula

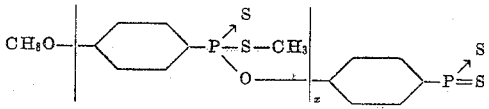

may also be formed.

Both the dimeric and the polymeric thionophosphine sulfides are exceedingly sensitive to moisture which causes slow decomposition with formation of hydrogen sulfide.

A most unusual behavior toward solvents is noted. Ordinarily a monomer and dimer is much more soluble than a relatively higher molecular polymer. In the present case however the dimer is almost completely insoluble in organic solvent whereas the polymers show fair to good solubility. While it is not intended to limit the invention to any particular theory we believe that the following is a possible explanation of the surprising behavior of the dimers and polymers toward solvents.

Since a formula with a 4-membered ring

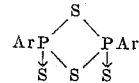

is highly improbable it is assumed that the dimer is a salt-like compound formed by semi-polar P—S bonds:

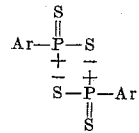

In the reaction of anisole with $P_4S_{10}$ the latter attacks predominantly the nucleus. However to a very minor extent it attacks also the methoxy group as evidenced by the formation of some methyl mercaptan when the mother liquors from the crystallized thionophosphine sulfide are hydrolyzed.

From what has been said it becomes clear that it is advantageous to perform the reactions with $P_4S_{10}$ at the lowest temperature at which hydrogen sulfide evolution occurs and to discontinue the heating when this evolution ceases.

It is an advantage that a commercial grade of phosphorus pentasulfide can be used. The use of a very pure grade offers but little advantage. The lower sulfides of phosphorus such as $P_4S_3$ or $P_4S_7$ do not phosphonate aromatic compounds such as anisole. When they are used together with sulfur, $P_4S_{10}$ is formed and such mixtures are therefore chemical equivalents of $P_4S_{10}$. However there is no advantage in using such mixtures and the yields obtained with pre-formed $P_4S_{10}$ are generally better. It is also possible to use elemental phosphorus and sulfur but this does not offer advantages.

The hydrolysis of the arylthionophosphine sulfides is a fairly slow reaction and prolonged boiling with water or heating under pressure is necessary to obtain good yields of the arylphosphonic acids. It is necessary to continue the hydrolysis until no more hydrogen sulfide is given off; blowing with steam to remove volatile and malodorous impurities is not sufficient. It is possible to effect hydrolysis under alkaline conditions. However, the reaction is much slower and in some cases where there are present alkali soluble impurities an impure product is obtained. Hydrolysis by heating with water is therefore preferred.

After the hydrolysis is complete, the excess of aromatic compound may readily be stripped off with steam and the phosphonic acid recovered from the aqueous solution. Where some by-products are formed as with some of the aromatic compounds it is more advantageous to separate the aqueous layer from the organic layer which contains contaminants. In some cases the phosphonic acid is not sufficiently soluble in water and will separate from the organic layer. In general the separation does not present any serious problem and therefore isolation of the first condensation product is not necessary. Where desired, however, such isolation can be effected because these reaction products are generally insoluble in the reaction medium and can be isolated by filtration and purified by crystallization from appropriate solvents.

As has been pointed out the mechanism with different aromatic compounds varies and so does the yield of arylphosphonic acid from phosphorus sulfide which varies from excellent with certain phenol ethers, such as anisole, to very good with other compounds. However, in each case the yields are superior to those obtainable by reaction of the aromatic compound with hexagonal phosphoric anhydride.

During the reaction, particularly in the first stage, the presence of large amounts of oxygen is undesirable. In large scale equipment the free air space, for example in suitable autoclaves, is so small that no serious precautions need be taken. However, in smaller equipment an inert gas atmosphere is preferable.

Some of the phosphonic acids which can be prepared according to this invention, for instance 2-isopropylnaphthylphosphonic acid, are of value as surface active agents. Others are of use as intermediates in the preparation of arylphosphonic dichlorides by conventional methods. These dichlorides in turn may be used for the preparation of esters to be used as plasticizers or lubricating oil additives. Of particular interest are the diallyl esters which give flame-resistant resins when polymerized per se or co-polymerized with other monomers. (See J. Am. Chem. Soc., vol. 70, page 186, and vol. 76, page 2191, and Ind. & Eng. Chem., vol. 40, page 2276.)

The arylthionophosphine sulfides are useful intermediates for the preparation of arylphosphonothioic dichlorides, aryltetrachlorophosphoranes and arylphosphonic dichlorides which in turn may be converted into esters which are valuable insecticides.

The application is a continuation-in-part of our application, Serial No. 402,392, filed January 5, 1954, now abandoned.

The invention will be illustrated in the following specific examples in which the parts are by weight unless otherwise specified.

*Example 1*

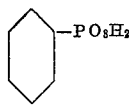

175.8 parts of benzene and 48.8 parts of phosphorus pentasulfide are heated with agitation in a stainless steel autoclave at 225° C. until reaction is complete. The clave contents consist of a tan solid and excess benzene. The solid is filtered off and washed with benzene and dried. According to the analysis and the molecular weight determination in naphthalene it consists of a mixture of dimeric phenylthionophosphine sulfide

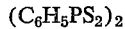

and $P_4S_7$ in the approximate molar ratio 4:1.

The solid is heated with 200 parts of boiling water until hydrolysis is complete. The resulting solution is clarified with decolorizing carbon, concentrated to a small volume and cooled to produce a good yield of phenylphosphonic acid.

This acid may be converted into its dichloride and further its diallyl ester by known methods. The use of this ester has been referred to above.

*Example 2*

The process of Example 1 was repeated at 200° C. and good yields of phenylphosphonic acid obtained. The yields were slightly lower than in Example 1 which represents about the optimum temperature.

The process was again repeated using a temperature of approximately 250° C. Again good yields were obtained but were not quite as high as in Example 1.

*Example 3*

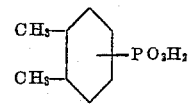

106 parts of o-xylene and 44.4 parts of phosphorus pentasulfide are heated with agitation in a stainless steel autoclave at a temperature of 185° C. until the reaction is complete. After cooling, 150 parts of water is added to the autoclave contents and refluxing is carried out to hydrolyze a primary reaction product. A separation of the organic layer from the water layer is made. The water layer is clarified with "decolorizing carbon" and cooled to produce a good yield of o-xylylphosphonic acid; M. P. crude acid 149–152° C., recrystallized from water 153–153.5° C. The homogeneous acid is probably 3,4-dimethylphenylphosphonic acid, but the position of the phosphonic group has not been proved.

The process was repeated at two different temperatures, 160° C. and 225° C. In each case good yields were obtained of the xylylphosphonic acid but the yields were slightly lower than when the optimum temperature of 185° C. was used.

The acid is converted into its dichloride and into its diallyl ester by conventional means, the ester being useful in the production of flame-resistant resins.

*Example 4*

432 parts of anisole and 177.6 parts of $P_4S_{10}$ (molar ratio 10:1) are heated with stirring to reflux until the reaction is complete. Hydrogen sulfide is evolved and the phosphorus pentasulfide gradually goes into solution. Eventually some of the p-anisylthionophosphine sulfide precipitates but its bulk crystallizes only on cooling, forming a thick slurry. The solid is filtered off.

If a sample of the solid is washed with anisole only and then dried in a vacuum desiccator to constancy it still retains about 12% anisole. This can be proved by heating the sample to 240° and distilling and collecting the anisole. When a sample of the original solids is recrystallized from o-dichlorobenzene and washed with benzene and dried in a vacuum desiccator to constancy, it still retains about 7% benzene which can be removed by heating to 240°.

A sample of the original solid was dried under reduced pressure at 150° until its weight became constant after 6 days. The analysis and a molecular weight determination in freezing p-nitrochlorobenzene confirmed the formula

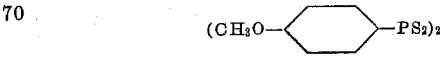

However, when the determination of the freezing point of the solution was repeated after several hours, the molecular weight had increased. This polymerization was partly noticeable in molten naphthalene. The melting point of the dimeric product is approximately 225°.

When the crystalline dimeric p-anisylthionophosphine sulfide is heated in dry nitrogen just high enough to keep it liquid (about 210°) for 5 hours, polymerization occurs. After cooling there is obtained a hard, brownish, transparent, brittle resin, very soluble in most of the common inert solvents.

The dimer is hydrolyzed by heating with eight times its weight of water until hydrolysis is complete. By concentrating the aqueous solution thus obtained to a small volume and cooling, p-anisylphosphonic acid is obtained in excellent yield and purity, M. P. 179–179.5° C. When the polymeric resin was hydrolyzed in a similar fashion the yield of phosphonic acid was considerably lower and a small amount of methyl mercaptan was formed.

The above process was repeated at two different temperatures, first at 140° and then again at 200° C. Good yields were obtained though slightly lower than at the optimum temperature of 155–160° C.

When, in the above process, $P_4S_7+3S$ or $P_4S_3+7S$ was substituted for $P_4S_{10}$ the reaction also proceeded but the yield of p-anisylphosphonic acid was somewhat lower.

The dimeric p-anisylthionophosphine sulfide is useful as starting material for insecticides. Treatment with 1 molar equivalent of chlorine in carbon tetrachloride gives p-anisylphosphonothioic dichloride. The latter can be converted in the conventional stepwise reaction into the ethyl-p-nitrophenyl ester of p-anisylphosphonothionic acid, a very efficient insecticide. In the form of a 1% dust the following percentage kills were obtained: mothweed bug 100%, confused flour beetle 95%, 0.1% feeding resulted in 100% kill of southern army worm and 95% kill of *Aphis rumicis*.

*Example 5*

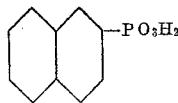

256 parts of naphthalene and 44.4 parts of phosphorus pentasulfide are heated together with stirring at a temperature of 170° C. until the reaction is complete. The temperature is lowered. During this lowering the primary reaction product precipitates from the molten naphthalene. Hydrolysis is accomplished without isolation by refluxing with 50 parts of water. Two layers result. The lower layer is separated from the upper organic layer and traces of naphthalene are stripped from this lower layer. On cooling, 2-naphthylphosphonic acid precipitates in good yield and purity.

The process was repeated at two other temperatures, first 150° C. and then 210° C. In each case the yields were good but slightly lower than the optimum temperature of 170° C.

2-naphthylphosphonic acid is the starting material for the preparation of dyestuff intermediates, disclosed in the co-pending application by K. C. Whitehouse and H. Z. Lecher, Serial No. 361,088, filed June 11, 1953, now abandoned.

Thus, 2-naphthylphosphonic acid is sulfonated at low temperature by mixing 10.4 parts with 15 parts of 100% sulfuric acid and adding gradually 13.8 parts of 65% oleum. The resulting 5-sulfo-2-naphthylphosphonic acid is isolated as trisodium salt by conventional means. 12 parts of this salt fused with 15 parts of sodium hydroxide and 3 parts of water at 260–320° C. give 5-hydroxy-2-naphthylphosphonic acid. The latter is coupled with tetrazotized dianisidine to give a disazo dye which is recovered by salting out. It dyes cotton and rayon in blue shades from an alkaline solution containing Glauber's salt.

*Example 6*

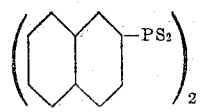

The pure primary reaction product of naphthalene with phosphorus pentasulfide was isolated in two experiments. In the first one a very large excess of naphthalene was used. 2.5 moles of naphthalene and 0.05 mole of $P_4S_{10}$ were heated together with agitation at 170–180° C. until reaction was complete. The resulting solution was cooled to 85° C. and 360 cc. of benzene was slowly added. The precipitate formed was filtered off at about 50° C. and washed with benzene (M. P. 262.5–265.5° C.). After recrystallization from o-dichlorobenzene the product showed the melting point 268–271° C. and gave the correct analysis for the above formula.

In the second experiment a smaller excess of naphthalene was used, but sulfur was added. 1.0 mole of naphthalene, 0.1 mole of $P_4S_{10}$ and 0.2 atom of sulfur were heated at 185–190° C. until reaction was complete. After the reaction mixture had been cooled to 100° C. it consisted of a fine slurry to which there was added 250 cc. of benzene at a temperature of 75–80° C. The crystalline product was filtered off at 50–60° and washed with benzene. After recrystallization from o-dichlorobenzene the product gave an analysis approaching the above sketched formula, but judging from the analytical figures and its melting point, it was not quite as pure as the product obtained in the first experiment.

*Example 7*

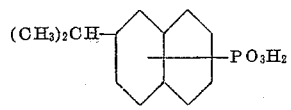

170 parts of 2-isopropylnaphthalene and 44.4 parts of phosphorus pentasulfide are heated with stirring at a temperature of 170–175° C. until reaction is complete. The temperature is lowered to below 100° C.; then the reaction mixture is hydrolyzed by refluxing with 50 parts of water. The organic layer is separated and deposits on cooling the 2-isopropylnaphthylphosphonic acid. The acid, recrystallized from an alcohol-water mixture, melts at 210–212° C. The position of the phosphonic group is not known. The product shows very good surface active properties. The wetting of cotton yarn in dilute aqueous medium was almost instantaneous as compared to several minutes in distilled water.

*Example 8*

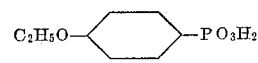

122 grams of phenetole and 44.4 grams of $P_4S_{10}$ (molar ratio 10:1) are heated to reflux with stirring until the reaction is complete. On cooling the p-phenetylthionophosphine sulfide crystallizes out and is filtered and washed with benzene. Its M. P. is approximately 225°. The hydrolysis carried out as in Experiment 4 gives an excellent yield of p-phenetylphosphonic acid.

We claim:

1. A process of producing an arylphosphonic acid which comprises heating at least 5 molar equivalents of the corresponding aromatic carbocyclic compound, free from polar substituents capable of reacting with $P_4S_{10}$ at a temperature falling within the range of 140–250° C. with 1 molar equivalent of $P_4S_{10}$ and hydrolyzing the reaction product by heating with water until evolution of hydrogen sulfide substantially ceases.

2. A process according to claim 1 in which the aromatic compound is present in at least 10 molar equivalents.

3. A process for producing an arylphosphonic acid which comprises heating at least 10 molar equivalents of an aromatic carbocyclic compound—free from polar substituents capable of reacting with $P_4S_{10}$—at a temperature within the range of 140–250° C. with 1 molar equivalent of $P_4S_{10}$ hydrolyzing the reaction products by heating with water until evolution of hydrogen sulfide substantially ceases, stripping simultaneously the excess aromatic compound off, and isolating the phosphonic acid from the aqueous still residue.

4. A process for producing a water-soluble arylphosphonic acid which comprises heating at least 10 molar equivalents of an aromatic carbocyclic compound—free from polar substituents capable of reacting with $P_4S_{10}$—at a temperature within the range of 140–250° C. with 1 molar equivalent of $P_4S_{10}$, hydrolyzing the reaction products formed by heating with water until the evolution of hydrogen sulfide substantially ceases, separating the 2 layers, and isolating the phosphonic acid from the aqueous layer.

5. A process for producing a water-insoluble arylphosphonic acid which comprises heating at least 10 molar equivalents of an aromatic carbocyclic compound—free from polar substituents capable of reacting with $P_4S_{10}$—at a temperature within the range of 140–250° C. with 1 molar equivalent of $P_4S_{10}$, hydrolyzing the reaction product by heating with water until the evolution of hydrogen sulfide substantially ceases, separating the layers, and isolating the phosphonic acid from the organic layer containing the excess aromatic compound.

6. A process for producing an arylphosphonic acid which comprises heating at least 10 molar equivalents of an aromatic carbocyclic compound—free from polar substituents capable of reacting with $P_4S_{10}$—at a temperature within the range of 140–250° C. with 1 molar equivalent of $P_4S_{10}$, isolating the primary reaction product by filtration, hydrolyzing it by heating with water until the evolution of hydrogen sulfide substantially ceases, and isolating the arylphosphonic acid.

7. A process according to claim 1 in which the aromatic compound is benzene and the reaction temperature is within the range of 200–250° C.

8. A process according to claim 3 in which the aromatic compound is benzene and the temperature is within the range of 200–250° C.

9. A process according to claim 1 in which the aromatic compound is o-xylene and the temperature range is within the range of 160–210° C.

10. A process according to claim 1 in which the aromatic compound is an ether of a monocyclic, monohydric phenol and the temperature is within the range of 140–200° C.

11. A process according to claim 10 in which the aromatic compound is anisole and the temperature is within the range of 140–200° C.

12. A process according to claim 1 in which the aromatic compound is naphthalene and the temperature is within the range of 140–210° C.

13. A process according to claim 1 in which the aromatic compound is 2-isopropylnaphthalene and the temperature range is 140–210° C.

14. 2-isopropylnaphthylphosphonic acid.

15. A compound having the following formula

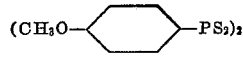

References Cited in the file of this patent
UNITED STATES PATENTS

| | | |
|---|---|---|
| 2,316,081 | Loane et al. | Apr. 6, 1943 |
| 2,316,086 | MacLaren | Apr. 6, 1943 |